INVENTORS
JOHN F. LONTZ
MICHAEL N. LA TORRA
BY JOHN V. PETRIELLO

James P. Malone

United States Patent Office 3,322,266
Patented May 30, 1967

3,322,266
FILM PACK FOR HEMODIALYZING MEMBRANES
John F. Lontz, Wilmington, Del., and Michael N. La Torra and John V. Petriello, North Babylon, N.Y., assignors to Kumlon Crafts, Incorporated, Arden, Del.
Filed Dec. 8, 1964, Ser. No. 416,717
3 Claims. (Cl. 206—63.2)

This invention pertains to means for packaging a roll of semipermeable membranes enclosed in an antiseptic solution for use as a disposable item in extracorporeal hemodialysis or what is commonly known as the artificial kidney.

Current dialyzers are of several types that include (a) twin-coil made up from narrow cellophane tubing wrapped around a plastic screen and costing about 50 dollars each, (b) cut parallel tube placed individually over plastic screens using inserts of stiff plastic serving as a fold manifold and usually requires 1–2 hours to assemble with required skill and manipulative dexterity, and (c) wide membrane sheets placed in a parallel plate dialyzer usually cut one at a time by whoever assembles the unit with very little control on uniformity and little attention to thorough disinfection.

In the present packaged roll of pre-cut membrane made to fit accurately and reliably the dialyzer, the costs, the time-consuming efforts and the nonuniform loading characteristic of present clinical dialyzers are obviated. The packaged pre-cut membranes are thus made available in large quantities as an inexpensive item since the cutting and packaging is done as continuing operation with the cost saving usually attending such means of production. The package having a sterilizing solution obviates particularly the tedious handling, cutting and pre-soaking of the membranes done manually and only at infrequent intervals with errors in dimensions and chance crinkling of the dry stock that often leads to pinhole leaks.

The object of this invention is hence to provide a simple, sterilized package of sealed membranes for use as an inexpensive disposable item once used in a dialysis. Another object is to provide a pre-soaked and a pre-treated membrane for use in clinical hemodialysis with an artificial kidney of the parallel plate type in which various pre-treatments are applied to modify the physical structure of the membrane including opening up the pores for higher rates of dialysis and ultrafiltration. Still another object is to provide a dependable, accurately pre-cut membrane that will lessen the incidence of faulty assembly of parallel plate dialyzers.

These objects are accomplished by assembling the membrane in pairs over a select configuration of the packaged roll according to pre-determined dimensions.

Figure 1:
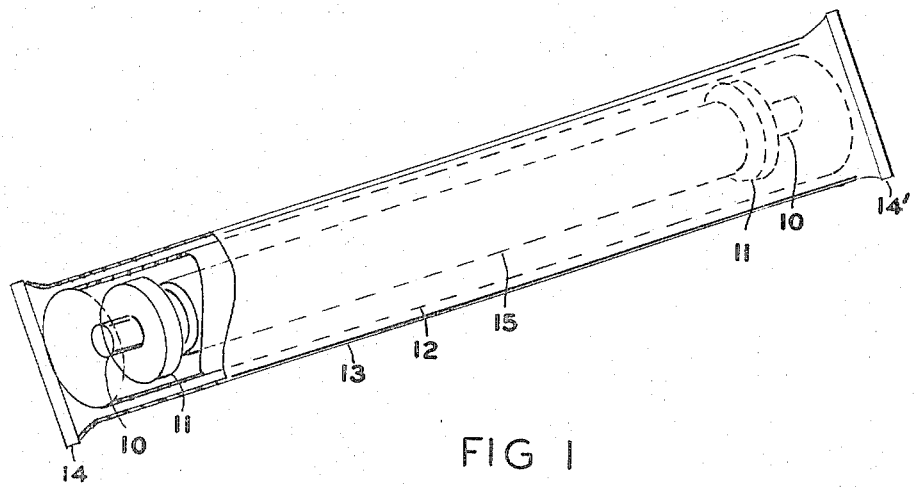
FIGURE 1 is a perspective view partially cut away showing the completed heat-sealed package.
Figure 2:
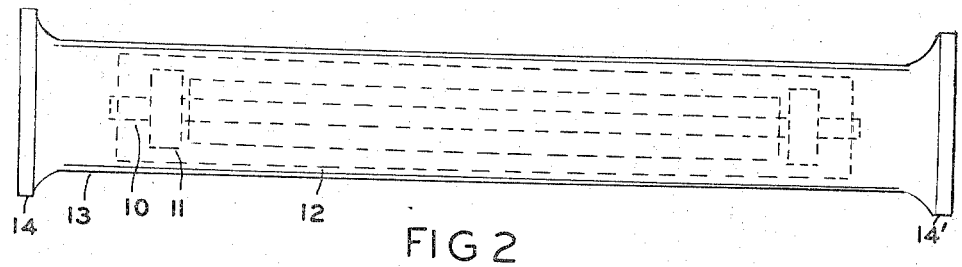
FIGURE 2 is a longitudinal view partly in cross-section showing the membrane in the package.

As illustrated, the complete package comprises an elongated spool 10 in the form of a rod or stiff tube made from a rigid ¼ inch diameter plastic such as polyethylene, polymethyl methacrylate, and the like, having end-stops or washers 11, ¼ inch thick and ⅞ inch in diameter positioned ½ to 1-inch from each end which serve for grasping and handling the semipermeable membranes 15 supplied in pairs and rolled between the end-stops 11 in pre-cut and pre-wetted or pre-treated form. The width and length of the membrane depend upon the size of dialyzer to be used, that used in one size of dialyzer measured in pre-wetted form 12 and ⅛ inch wide by 52 inches in length. Understandably, these dimensions will change as the engineering dimensions of the dialyzer are modified with continued modifications.

Figure 3:
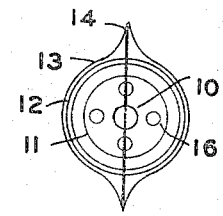
FIGURE 3 is an end view of the complete package showing the geometric arrangement of the various components.

The rolled membranes and the spool are then inserted in a thin but semi-rigid open-ended case 12 usually made of polyvinyl chloride measuring 1-inch in internal diameter by 10-mil wall thickness. Next, the encased spool is inserted in a slightly snug casing of 2 to 5-mil polyethylene tubing 13 heated sealed at one end 14. A sterilizing solution made of ⅟₅₀₀ to ⅟₁₀₀₀ "Zephiran" is added to the package and the second end 14′ is heat-sealed to provide a closed package. The end-stops or washers 11 are provided with holes 16 as shown in FIGURE 3 which serve to permit free movement of the sterilizing solution that may result on standing or shifting in storage; these holes also serve to rinse out chemicals that have been used to pre-treat the film for opening the holes or for chemically modifying the structure of the cellophane.

In preparing the package the pre-cut membranes, usually two of them to make up the dialyzing blood compartment, are wrapped onto the spool 10 in between the end-stops or washers 11 and then inserted into the tube 12 and the heat-sealed casing 13 as described above. For use in assembling the dialyzer, one of the sealed ends is cut off with scissors or sharp blade and the spool 10 is withdrawn by grasping at the opened end. The roll is then placed at one end of the dialyzer, either the inlet or the outlet, in such a manner that the end-stops or washers 11 rest on the lengthwise edge of the dialyzer just outside of the gasket line.

The edge of exposed membrane, which happens to be first of two on the roll, is then placed about ¼ to ½ inch outside the gasket line, and held in place while the roll is moved toward the opposite end of the plate and also beyond the gasket line. The inlet and outlet ports for the blood flow are emplaced over this first membrane and then the second membrane is placed on the first membrane in a similar manner, that is by lining up the end-stops or washers 11 on the lengthwise edge of the plate. The top covering plate of the dialyzer is then placed on top of the membrane and in register with the bottom plate and secured by the usual bolting or clamping method. The membranes are usually used only once per dialysis run or treatment and then discarded.

As mentioned previously, the dimensions given are only by way of one example adapted to one type of clinical dialyzer. Other modifications for commercial dialyzers involving biological and pharmaceutical fluids may require other dimensions and arrangements that would vary in membrane width and length. The principal materials are made from plastics, particularly linear polyethylene or polypropylene for the spool, low density polyethylene for the tube and heat-sealable case. The rod portion can also be made of polyvinyl chloride or polyoxymethylene since rigidity is important for smooth nonwrinkled or nonbuckling rolling of the membrane. While the description referred to uses one pair of membranes, it is equally applicable to placing two or more pairs of membranes where several dialyzers are being assembled.

It is feasible to use two or more pairs with an interposing layer of plastic screening emplaced in the dialyzers where an array of two or more membrane sets are used. For clinical dialyzers used as artificial kidney, cellophane of the usual variety including that made by the cuprammonium process is the most common used. The packaging is equally applicable to other membranes currently being used and developed to improve or increase the dialysis clearance rates derived from polyvinyl alcohol, polyvinyl pyrrolidone, polymeric acrylic derivatives, as well as other chemically modified forms of cellulose such as ethyl cellulose, sodium carboxymethyl cellulose and its acidic form, and the like. Moreover, the packaging is also applicable to combinations of membranes in which one serves for dialysis and the other for gaseous diffusion of oxygen and carbon dioxide in extracorporeal oxygenation of blood. The latter includes ultrathin films of polytetrafluoroethylene, polysiloxane and their modifications with mesh and screening.

While we have described the principal features of a novel packaging of sterilized dialysis membrane with specific construction and arrangement of the various components, it is not intended that the indicated packaging dimensions be restricted thereto as they serve to describe other implied variations.

What is claimed is:

1. A packaged form of semipermeable membranes, pre-cut and pre-treated to pre-determined dimensions, comprising in combination a spool with limiting ends approximating the width of the membranes thereon in convolute form and emplaced in an inner rigid case which is in turn enclosed in a thin flexible, heat-sealable tube, said packaging containing a sterilizing fluid.

2. A packaged, ready to apply form of pre-cut and pre-treated semipermeable membrane derived from cellulose contained on a spool with limiting ends that serve to emplace the membrane in rolled form and fitted with ports to permit free drainage and flow of the stored sterilizing fluid, said spool being enclosed in a thin rigid case which in turn is enclosed in a thin flexible, heat-sealable film in tubular form, said package containing an aqueous sterilizing fluid serving to dimensionally stabilize the membrane in its wetted form and to maintain its aseptic condition.

3. A packaged, ready to use form of pre-cut and pre-treated semipermeable membrane in combination with a diffusion membrane emplaced on a spool in a convolute manner over a spool with limiting and retaining ends that serve to contain securely the membranes in complete register and said ends fitted with ports to permit free drainage and flow of the stored fluid, said spool being encased in a thin rigid inner case which is in turn encapsulated in a thin flexible, heat-sealable film in tubular form serving as the outer protective case, said package containing an aqueous sterilizing fluid, sealed against contamination of airborne bacteria and other biologically deleterious substances.

References Cited
UNITED STATES PATENTS

| | | | |
|---|---|---|---|
| 443,812 | 12/1890 | Barber | 206—63.3 |
| 1,175,369 | 3/1916 | MacDonald | 206—63.2 |
| 2,959,280 | 11/1960 | Lloyd | 206—63.3 |
| 3,123,211 | 3/1964 | Sorenson | 206—63.2 |

THERON E. CONDON, *Primary Examiner.*

M. L. RICE, *Assistant Examiner.*